United States Patent [19]
Dixon et al.

[11] Patent Number: 5,355,731
[45] Date of Patent: Oct. 18, 1994

[54] SPHERICITY DETERMINATION USING RESONANT ULTRASOUND SPECTROSCOPY

[75] Inventors: Raymond D. Dixon, Los Alamos; Albert Migliori, Santa Fe; William M. Visscher, Los Alamos, all of N. Mex.

[73] Assignee: The Regents of the University of California, Office of Technology Transfer, Alameda, Calif.

[21] Appl. No.: 880,393

[22] Filed: May 8, 1992

[51] Int. Cl.$^5$ .............................................. G01H 13/00
[52] U.S. Cl. ...................................... 73/579; 73/602
[58] Field of Search ................ 73/579, 602, 593, 597, 73/645, 646, 659

[56] References Cited

U.S. PATENT DOCUMENTS

| | | | |
|---|---|---|---|
| 4,122,723 | 10/1978 | Levizzari et al. | 73/579 |
| 4,704,905 | 11/1987 | Arora | 73/602 |
| 4,976,148 | 12/1990 | Migliori et al. | 73/579 |
| 5,062,296 | 11/1991 | Migliori | 73/579 |
| 5,144,838 | 9/1992 | Tsuboi | 73/579 |
| 5,228,004 | 7/1993 | Kawasaki | 73/579 |
| 5,257,544 | 11/1993 | Khuri-Yakub et al. | 73/579 |

OTHER PUBLICATIONS

E. Schreiber et al., *Elastic Constants and Their Measurement*, Chapter Five, "Resonant-Sphere Methods for Measuring the Velocity of Sound," pp. 127–141, McGraw-Hill Book Company (1973).

W. M. Visscher, "On the Normal Modes of Free Vibration of Inhomogeneous and Anisotropic Elastic Objects," J. Acoust. Soc. Am., 90 (4) Pt. 1, pp. 2154–2162 (1991).

*Primary Examiner*—Hezron E. Williams
*Assistant Examiner*—Rose M. Finley
*Attorney, Agent, or Firm*—Ray G. Wilson

[57] ABSTRACT

A method is provided for grading production quantities of spherical objects, such as roller balls for bearings. A resonant ultrasound spectrum (RUS) is generated for each spherical object and a set of degenerate sphere-resonance frequencies is identified. From the degenerate sphere-resonance frequencies and known relationships between degenerate sphere-resonance frequencies and Poisson's ratio, a Poisson's ratio can be determined, along with a "best" spherical diameter, to form spherical parameters for the sphere. From the RUS, fine-structure resonant frequency spectra are identified for each degenerate sphere-resonance frequency previously selected. From each fine-structure spectrum and associated sphere parameter values an asphericity value is determined. The asphericity value can then be compared with predetermined values to provide a measure for accepting or rejecting the sphere.

8 Claims, 6 Drawing Sheets

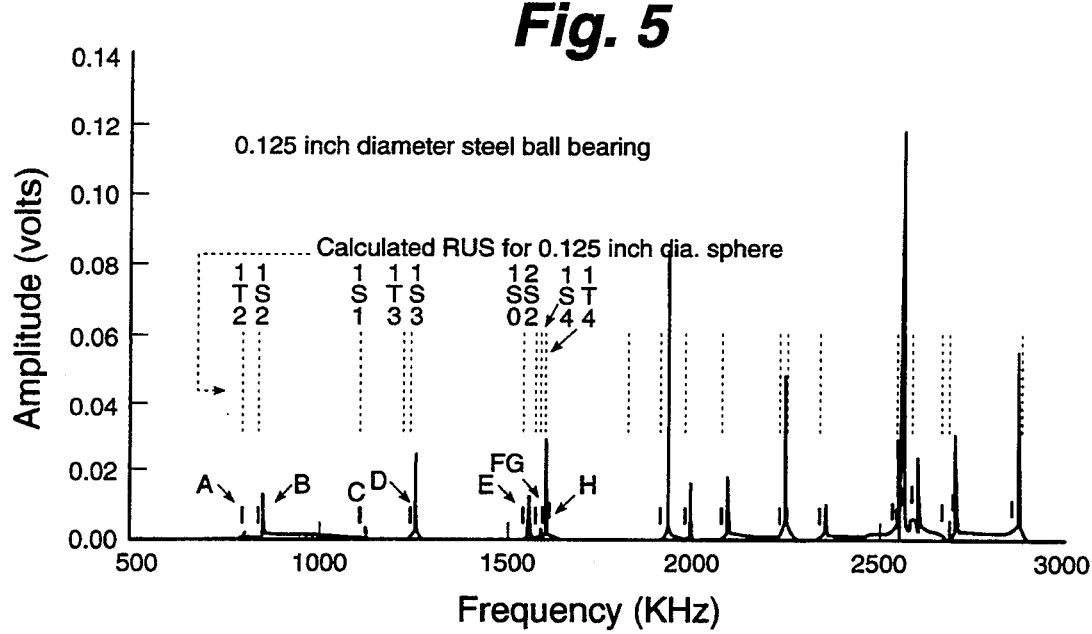
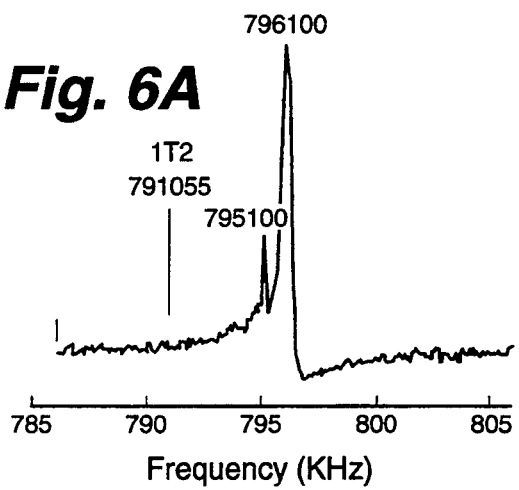
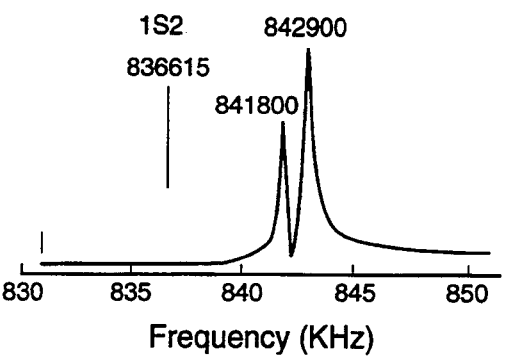
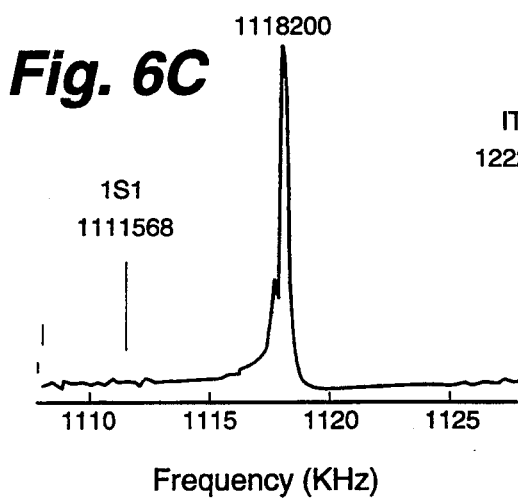
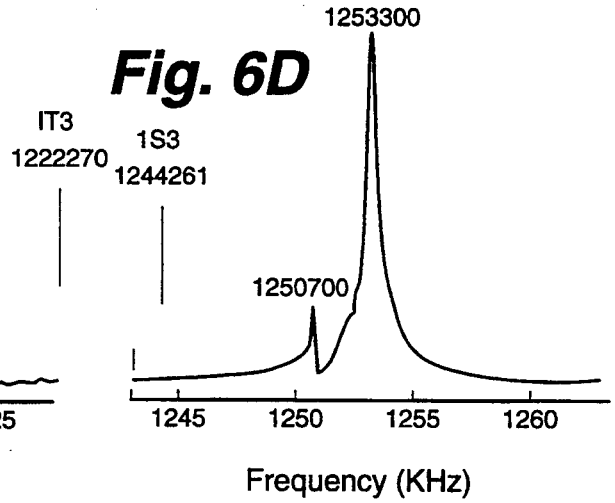

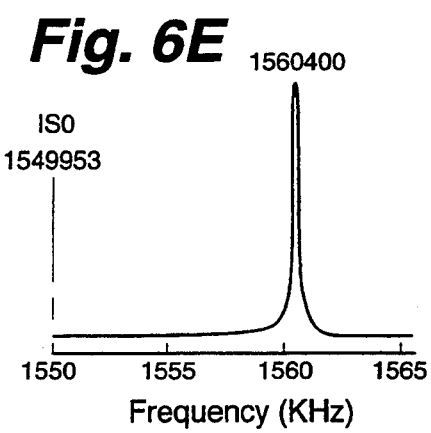
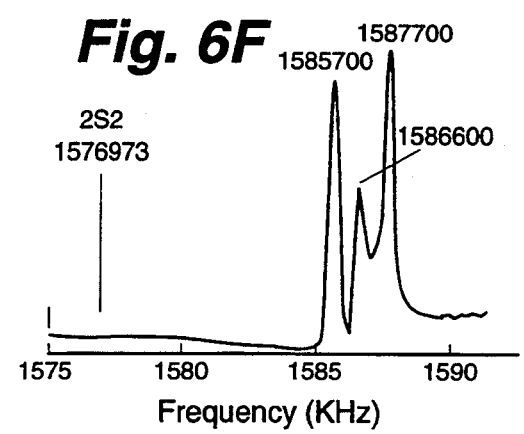
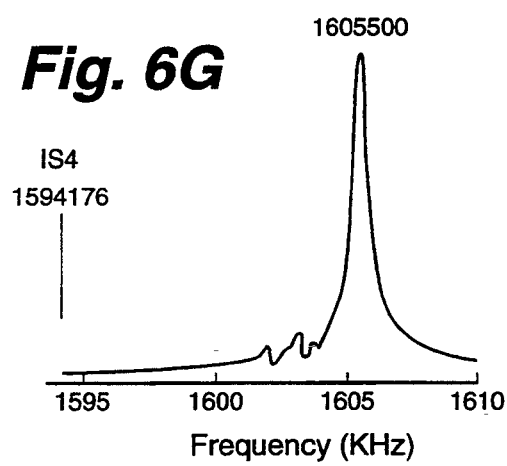
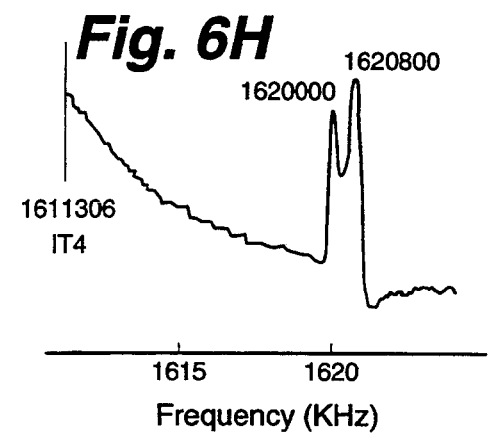

SPHERICITY DETERMINATION USING RESONANT ULTRASOUND SPECTROSCOPY

This invention is the result of a contract with the Department of Energy (Contact No. W-7405-ENG-36).

BACKGROUND OF INVENTION

This invention relates to nondestructive testing and, more particularly, to nondestructive determinations of sphericity of objects such as roller balls.

Ball bearings are a standard rolling contact bearing type for use in transferring loads between rotating and stationary members and in permitting relative rotation with a minimum of friction. Roller balls rotate between two raceways to provide only rolling friction between the relatively moving surfaces. The roller balls are manufactured with extremely tight tolerances on the sphericity of the balls in order to provide a low rolling friction and to provide the thousands of operating hours for which ball bearings are typically designed.

Nondestructive examination (NDE) devices for spherical objects, such as roller balls, currently include micrometers, roundness gages, optical, and electron-optical devices. These devices may be accurate to parts per million or less but they cannot process the quantities of roller balls produced by state-of-the art techniques. Use of the measuring devices is time consuming, typically requiring from 15 min. to 1.5 hr. to determine the sphericity of a ball. Further, the devices measure only discrete locations on the balls and do not accurately describe the entire body of a sampled ball. Thus, sampling techniques are only available to statistically inspect production quantities of roller balls such that individual defective balls may be installed in roller bearings with a concomitant increase in operating friction and reduction in operating lifetime.

These inspection problems are addressed by the present invention and a resonant ultrasound spectroscopy (RUS) technique is presented for examining quantities of roller balls made in a production run. It is therefore an object of the present invention to provide for inspecting roller balls at a rate consistent with the manufacturing process.

It is an object of the present invention to provide an inspection technique that provides a sensitivity compatible with roller ball standards.

Yet another object of the present invention is to adapt RUS techniques to the inspection of production quantities of roller balls.

A further object of the present invention is to provide a roller ball inspection process that characterizes the entire body regardless of orientation in an inspection device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process of this invention may comprise a method for grading spherical components. A resonant ultrasound spectroscopy (RUS) spectrum is generated from a spherical object. Sphere parameter values for the spherical object are determined from first components of the RUS spectrum. An asphericity value for the spherical object is determined from second components of the RUS spectrum and said spherical parameter values. The asphericity value is then compared with predetermined values to grade the spherical product. In one embodiment, the first RUS spectrum components are degenerate sphere-resonance frequencies. The second RUS spectrum components are fine-structure resonant frequencies from which actual semi-major axes are computed from selected resonant modes in the RUS spectrum.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 5 graphically depicts a RUS spectra for an exemplary steel ball bearing.

FIGS. 6A–6H are expansions of FIG. 5 and graphically depict the fine-structure RUS spectra for various fundamental mode frequencies.

DETAILED DESCRIPTION OF THE INVENTION

In accordance with the present invention resonant ultrasound spectroscopy (RUS) provides a rapid and accurate method for measuring deviations from sphericity. A new NDE technique is provided to quickly inspect spherical objects to determine their acceptability from a quality acceptance standpoint with virtually 100% inspection of spherical parts. Thus, product quality is assured, not statistical, and product manufacturing trends can be identified and corrected before quantities of defective products are manufactured.

Figure 1:
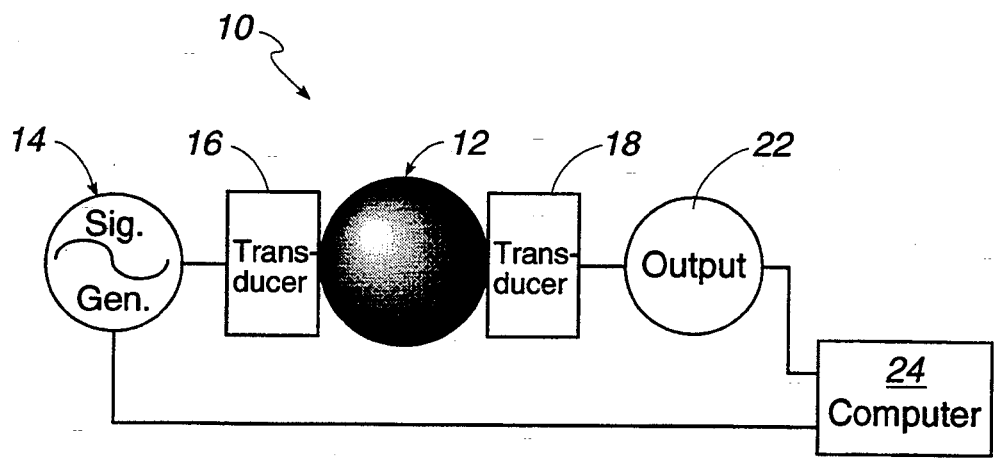
FIG. 1 is a schematic diagram, in block form, of apparatus for generating and analyzing a RUS spectrum.

RUS relates the resonant ultrasound spectrum of a component to the dimensions and material properties of the component. As used herein, RUS enables the shape of an object, i.e., the sphericity and asphericity of an object, to be determined from a RUS spectrum. FIG. 1 depicts a simplified schematic of a system 10 for generating and analyzing the RUS spectrum of specimen 12. Signal generator 14 excites transducer 16 for vibrating sphere 12 over a predetermined frequency range, e.g., between 4 and 4000 kHz. The response of sphere 12 is detected by transducer 18 and supplied to an output amplifier 22. A suitable RUS system 10 is described in U.S. Pat. No. 4,976,148, issued Dec. 11, 1990, to Migliori et al. The outputs from signal generator 14 and output amplifier 22 are input to computer 24 for analysis and computation of an asphericity value for sphere 12.

In an overview of the present method, normalized RUS spectra for the vibrational modes of a perfect sphere are known as a function of Poisson's ratio. An RUS spectrum is obtained from a production sphere (see FIG. 5) and first components of the spectrum, i.e., the degenerate resonance frequencies, are identified as originating from a perfect sphere. This is accomplished by reducing the fine structure resonances to an estimate of the degenerate resonances. The reduction involves replacing fine structure resonances with estimations of degenerate resonances through comparisons with known fine structure and degenerate resonances. Poisson's ratio for the production sphere can then be determined by comparing the identified and calculated degenerate sphere-resonances of a homogeneous isotropic elastic sphere (see FIG. 2). From the identified sphere-resonance frequencies in the measured spectra and the value of Poisson's ratio, a "best" spherical diameter can be calculated. The value of Poisson's ratio and spherical diameter are herein called "spherical parameters."

A deviation from sphericity (herein called "asphericity") is then calculated from second components of the spectrum, i.e., the fine-structure resonant frequencies (see FIGS. 6A–6H), using the spherical parameters, e.g., value of Poisson's ratio, determined from the first components of the spectrum. When a sphere deviates from a perfect sphere, i.e., the maximum diameter is not equal to the minimum diameter, most of the degenerate resonant frequencies become split, i.e., the sphere-resonant frequencies split into multiple resonant frequencies (see FIG. 3). The splitting in the resonant frequencies is generally linear near the degenerate resonant frequencies as a function of the distortion. In accordance with this invention, the multiple frequencies are presented in a data format from which an asphericity value can be calculated. Thus, an actual asphericity can be calculated from the multiple frequencies for each mode. The calculated asphericities may be averaged over selected modes to obtain an average asphericity from which the sphere can be graded. The production sphere is then accepted or rejected based on some predetermined value regarding deviation from sphericity.

Figure 2:
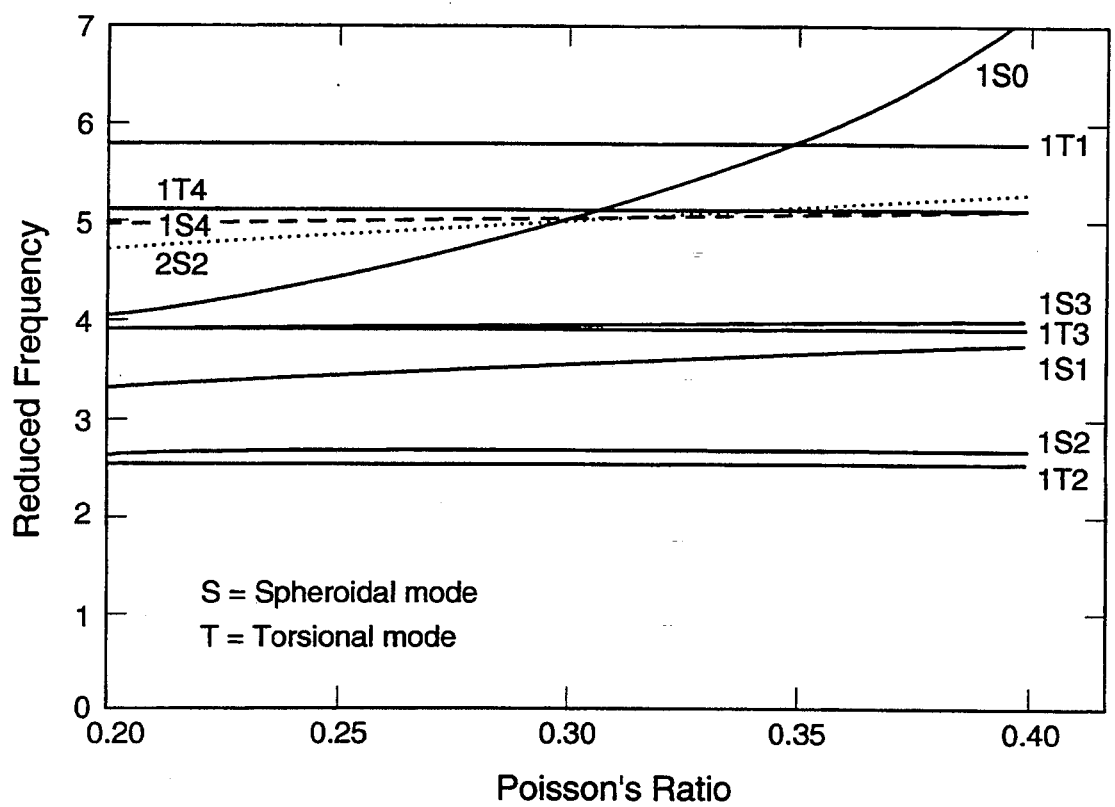
FIG. 2 graphically depicts the relationship between reduced resonant frequencies and Poisson's ratio.

FIG. 2 graphically depicts the known relationships between degenerate sphere-resonance frequencies of a homogeneous isotropic elastic sphere and Poisson's ratio $\sigma$, where the ordinate is the reduced frequency ($F$):

$$F = K_s a = \omega t_s;$$

$$K_s = \omega/V_s;$$

$$t_s = a/V_s$$

$$\omega = 2\pi f,$$

where
f is the measured frequency,
$t_s$ is the transit time of a shear wave between sphere center and surface,
a is the spherical radius, and
$v_s$ is the speed of sound of a shear wave.
$V_s = (\mu/\rho)^{\frac{1}{2}}$, where
$\mu$ = shear modulus
$\rho$ = density.
The modes are labeled according to whether they are torsional (T) or spheroidal (S).

FIG. 2 is a universal plot valid for all isotropic and homogeneous elastic spheres with the mode nomenclature given by nSl or nTl, where l and n are integers that determine the surface displacements for oscillations of a sphere. See, e.g., E. Schreiber et al., *Elastic Constants and Their Measurement*, Chapter Five, "Resonant-Sphere Methods for Measuring the Velocity of Sound," pp. 127–141 McGraw-Hill Book Company (1973). By comparing the data depicted in FIG. 2 with the measured degenerate sphere-resonance frequencies, the mode resonant frequencies can be identified by mode parameters (n, l) and the spheroidal/torsional nature of the modes. By aligning the measured reduced frequencies with reduced frequency values as shown in FIG. 2, a value of Poisson's ratio $\sigma$ is readily found. Once Poisson's ratio has been determined for the component being examined, the above equations can be used to calculate a spherical diameter, 2a, to form the sphere parameters.

Figure 3:
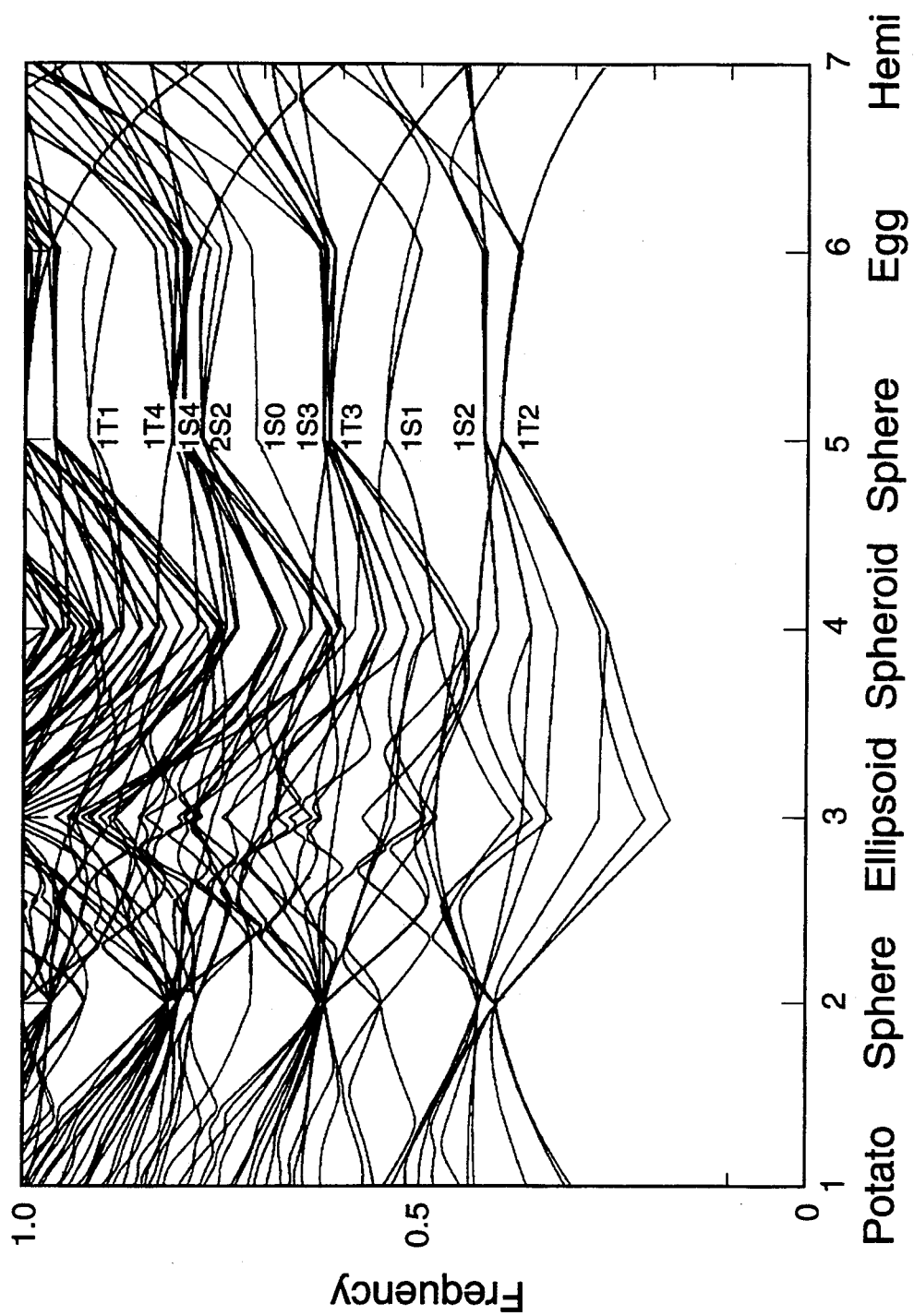
FIG. 3 graphically depicts various resonant frequencies for distortions of spherical components.

Each of the curves shown in FIG. 2 is (2l+1) degenerate. That is, if the sphere is slightly distorted into an ellipsoid with no rotational symmetries, each curve splits into (2l+1) curves. If, on the other hand, the distortion is spheroidal, with the shape invariant under rotation about some axis, some degeneracy remains. For example, with l=1, instead of a fine structure with (2+1=3) curves, there are only 2 curves. FIG. 3 depicts the breaking of degeneracies for various distortions of a perfect sphere. In the general case any small axisymmetric deformation gives a fine-structure with l+1 components.

The multiplicity of curves shown in FIG. 3 and their relative positions gives both qualitative information about the type of distortion and quantitative information about the magnitude of the deviations from spherical. The semi-axis dimensions for the components shown in FIG. 3 are set out in Table A, where each d is one semi-axis of a generalized ellipsoid, i.e., a "potato" (FIG. 3). The most probable imperfections, in terms of the semi-axes, will be those with partial rotational symmetry such that

TABLE A

| k | Object | $d_{1+}$ | $d_{1-}$ | $d_{2+}$ | $d_{2-}$ | $d_{3+}$ | $d_{3-}$ |
|---|--------|------|------|------|------|------|------|
| 1 | sphere | 1.0 | 1.0 | 1.0 | 1.0 | 1.0 | 1.0 |
| 2 | spheroid | 1.0 | 1.0 | 1.0 | 1.0 | 1.5 | 1.5 |
| 3 | egg | 1.0 | 1.0 | 1.0 | 1.0 | 1.5 | 0.5 |
| 4 | ellipsoid | 0.5 | 0.5 | 1.0 | 1.0 | 1.5 | 1.5 |
| 5 | hemisphere | 1.0 | 1.0 | 1.0 | 1.0 | 1.0 | 0.0 |
| 6 | potato | 0.25 | 1.0 | 0.5 | 1.25 | 0.75 | 1.5 |

In accordance with the present invention, it was recognized that small deviations from sphericity are linearly related to frequency splitting of degenerate resonant frequencies of a sphere.

Figure 4:
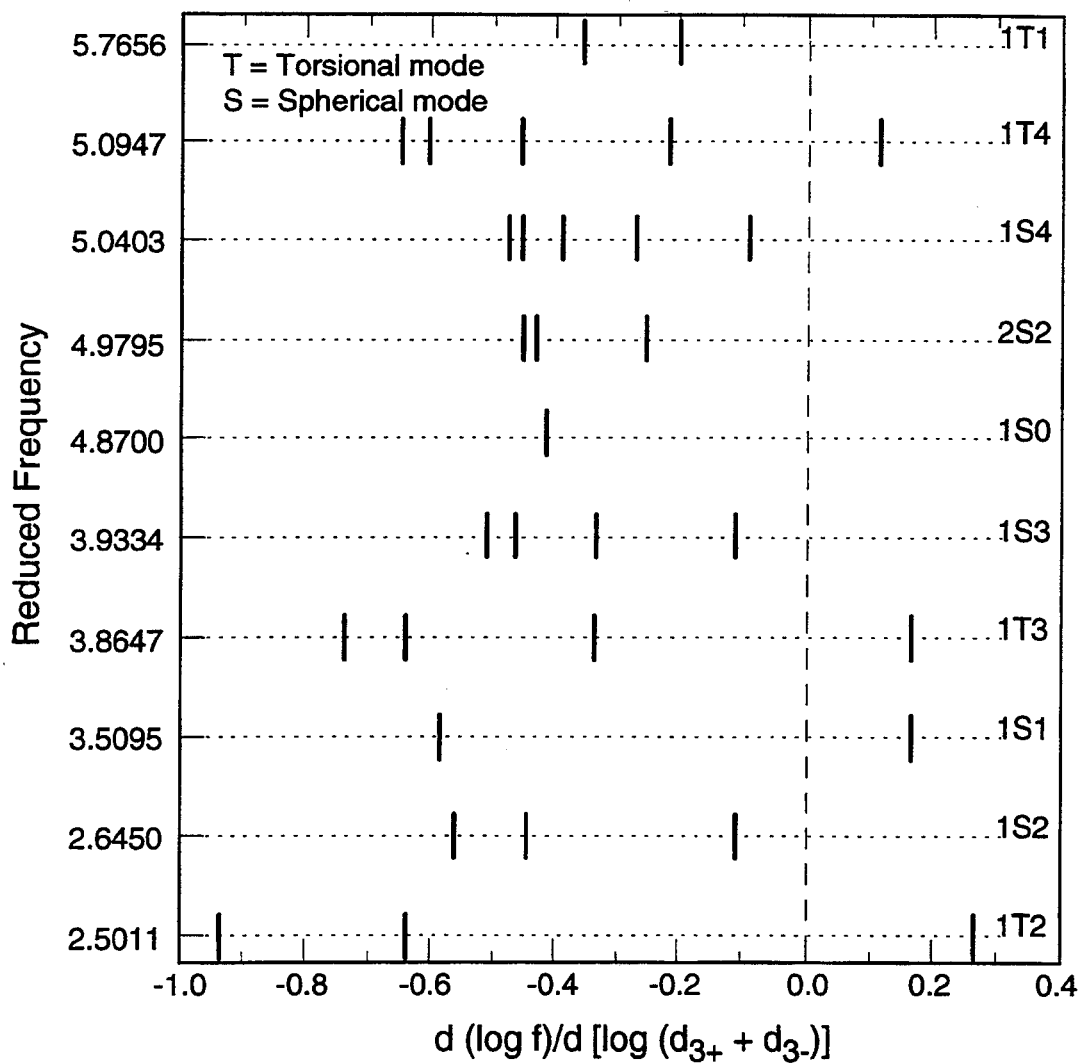
FIG. 4 graphically depicts fine-structure resonance characteristics for spheroidal and droplike distortions at a Poisson's ratio of 0.29.

A suitable software routine for constructing the relationships shown in FIG. 4 is presented by W.M. Visscher et al., "On the Normal Modes of Free Vibration of Inhomogeneous and Anisotropic Elastic Objects," J. Acoust. Soc. Am. 90 (4), Pt. 1, pp. 2154–2161 (1991), incorporated herein by reference. A suitable Poisson's ratio is input and selected dimensions are varied. The routine outputs the normal mode frequencies from which a data file can be constructed to relate normal mode frequencies to dimensional changes.

FIG. 4 graphically depicts relationships between deviations from spherical shape and shifts in resonant frequencies arising from the fine-structure frequency splitting of the degenerate resonant frequencies of the sphere. FIG. 4 shows how the spectrum is split when a sphere is distorted by changing its diameter in the $d_{3+/-}$-direction while keeping its rotational symmetry about the $d_3$ axis. A distortion with either $d_{3+}$ or $d_{3-} = 0$ and the other axis non-vanishing is called a "drop"; it is a spheroid if $d_{3+} = d_{3-} \neq r$, either prolate or oblate depending on whether $d_{3+} = d_{3-}$ is greater or less than r. The fine-structure resonances for either droplike or spheroidal distortions can be read from FIG. 4.

FIG. 4, as shown, is determined for 52100 low-alloy steel having a Poisson's ratio $\sigma = 0.29$. Each mode resonance line is labeled by a reduced frequency, as described for FIG. 2. It will be understood that the plot does not change appreciably for $0.25 < \sigma < 0.35$. The abscissa is in the fractional change frequency per fractional change in the 3-diameter $(d_{3+} + d_{3-})$. For example, if $(d_{3+} + d_{3-})$ is increased by 1%, the lowest member of the T2 multiplet shifts down by 0.93% (from 2.5011). As shown below, once $\sigma$ is determined for a given material and the average diameter of the sphere being manufactured is calculated, only one mode splitting is required to precisely determine the deviations from sphericity.

Referring now to FIGS. 5 and 6A–6H, actual resonance spectra from a roller ball are shown. FIG. 5 is the RUS spectrum showing resonant frequencies for a nominal 0.125 inch nominal diameter roller ball, along with the calculated resonant frequencies for a perfect sphere of 0.125 inch diameter. The fine-structure resonant frequency spectra are shown in FIGS. 6A–6H, which are expansions of the specta shown in FIG. 5 and show one spectrum for each degenerate sphere-resonance frequency. A degenerate sphere-resonance frequency is obtained from each of these spectra (FIGS. 6A–6H) by taking the first moment of the spectra and identifying it with a degenerate sphere-resonance frequency. These "average" frequencies are converted to reduced frequencies and compared with the degenerate sphere-resonance frequencies shown in FIG. 2 and a Poisson's ratio is determined. Then a spherical diameter is calculated, e.g., a statistically best radius, as if the roller ball were a "perfect" manufactured sphere. Poisson's ratio and the calculated spherical diameter form a set of sphere parameter values.

Each fine-structure spectrum shown in FIGS. 6A–6H is then associated with a degenerate sphere-resonance frequency and the frequency shifts are determined from the selected degenerate modes. As shown below, a dimensional value $(d_{3+} + d_{3-})$ can be calculated for each spheroidal and torsional mode and these values can be used to determine the asphericity of the roller ball. The roller ball is then either accepted or rejected on the basis of a comparison between the asphericity values and some predetermined values or tolerances. In theory only a single fine-structure is needed. An average asphericity is preferably determined by obtaining the asphericity from selected fine-structure resonant frequencies.

Figure 7:
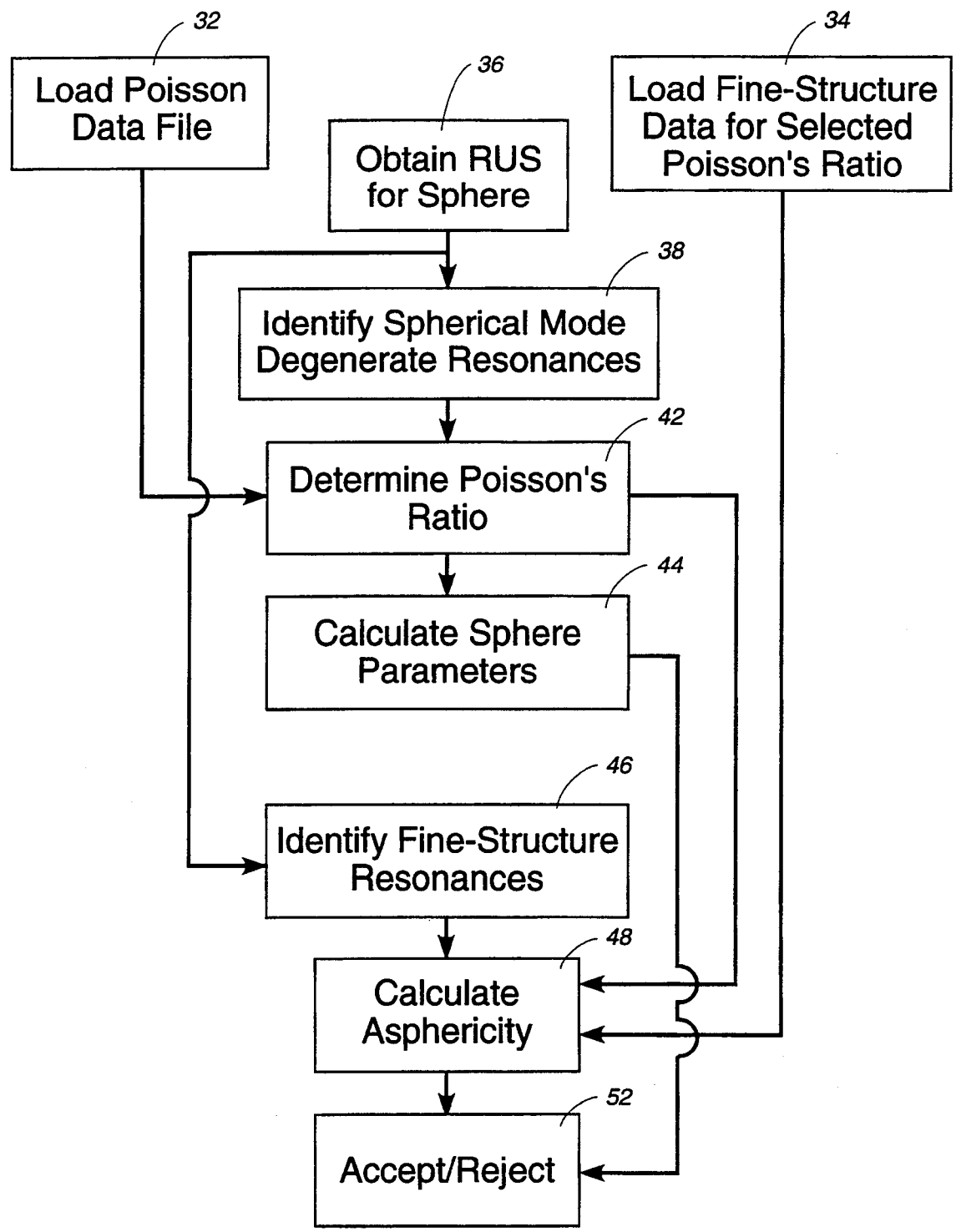
FIG. 7 is a block flow diagram of the process according to the present invention.

FIG. 7 depicts a flow diagram for use of RUS data in NDE testing of roller balls. A data file of reduced resonant frequencies for degenerate sphere-resonances in spherical structures (see FIG. 2) is formed as a function of Poisson's ratio and is loaded 32 into a computer. A data file is also calculated and loaded 34 to show the fine-structure resonant frequencies for small deviations from sphericity for the material used to manufacture the roller balls (FIGS. 3 and 4). An exemplary fine-structure data file as shown in FIG. 4 is based on a Poisson's ratio of 0.29 for a spheroidal shape, but FIG. 4 can be used for a range of Poisson's ratio from 0.25 to 0.35.

A production spherical component, i.e., a roller ball, is acoustically excited over a selected range of frequencies (FIG. 1) and the RUS spectra are obtained 36. The spectra are then evaluated to identify 38 the resonant frequencies for selected sphere-resonances. From the identified measured frequencies, Poisson's ratio is determined 42 from the Poisson data file 32. Assuming a perfect sphere, a spherical diameter can now be calculated using each degenerate sphere-resonance frequency, e.g., a best diameter from a least squares fit to form a set of sphere parameters 44 with the determined Poisson's ratio 42.

The fine-structure resonant frequencies are then identified 46 from the RUS spectra and each resonant frequency is assigned to a degenerate mode. From the fine-structure data 34 and determined Poisson's ratio 42, an asphericity value is calculated 48 for selected resonant frequencies. As shown in FIG. 4, the fine-structure data 34 relate a frequency change to a diameter change:

$$d(\log f)/d(\log (d_{3+} + d_{3-})) = [(f - f_0)/f_0]/[(d_{3+} + d_{3-} - 2a)/2a],$$

where
f = fine-structure resonant frequency
$f_0$ = degenerate sphere-resonance frequency
a = average spherical radius from step 44.

An asphericity value is quantitatively defined as $(d_{3+} + d_{3-} - 2a)/2a$. Thus, each fine structure measurement yields an asphericity, which can be gauged against prescribed acceptance/rejection values to accept/reject 52 the sphere.

Thus, the process steps depicted in FIG. 7 permit spherical parts to be quickly and accurately inspected for sphericity. Other nonuniformities in the manufactured spheres such as cracks or internal voids will also affect the RUS spectrum such that a rejection signal will also occur. Roller balls for ball bearings can be 100% inspected rather than sampled and graded according to sphericity for various applications. Further, drifts in manufacturing parameters can be detected and corrected before large lots of deviant material are produced.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for grading spherical objects against predetermined values, comprising the steps of:
generating a resonant ultrasound spectrum from a spherical object, where said spectrum includes a plurality of fine-structure resonant frequency spectra;

estimating from each one of said fine-structure resonant frequeny spectra a corresponding degenerate sphere-resonance frequency;

determining from said degenerate sphere-resonance frequencies of said spectrum sphere parameter values of said spherical object;

determining from said fine-structure resonant spectra of said spectrum and said sphere parameter values an asphericity value of said spherical object; and comparing said asphericity value with said predetermined values to grade said spherical object.

2. A method according to claim 1, wherein the step of determining said sphere parameter values further comprises the steps of:

determining a value of Poisson's ratio from said degenerate sphere-resonance frequencies; and calculating a sphere diameter effective to produce said degenerate sphere-resonance frequencies at said determined value of Poisson's ratio.

3. A method according to claim 1, wherein the step of determining said asphericity value further comprises the steps of:

calculating from said fine-structure resonant frequency spectra and said sphere parameter values individual asphericity values that produce the fine-structure resonant frequency spectra measure for selected degenerate sphere-resonances in said spectrum; and averaging said individual asphericity values for each one of said selected degenerate sphere-resonances to determine said asphericity value of said spherical object.

4. A method according to claim 2 wherein the step of determining said asphericity value further comprises the steps of:

calculating from said fine-structure resonant frequency spectra and said sphere parameter values individual asphericity values that produce the fine-structure resonant frequency spectra measure for selected degenerate sphere-resonances in said spectrum; and average said individual asphericity values for each one of said selected degenerate sphere-resonances to determine said asphericity value of said spherical object.

5. A method for grading spherical objects against predetermined values, comprising the steps of:

calculating a set of degenerate sphere-resonance frequencies for said object;

associating said set of degenerate sphere-resonance frequencies with a value of Poisson's ratio for said spherical object;

calculating sphere parameter values for said spherical object from said set of degenerate sphere-resonance frequencies and said value of Posson's ratio;

identifying fine-structure resonant frequency spectra associated with each degenerate sphere-resonance frequency in said set;

generating an asphericity value from each said fine structure resonant frequency spectra and said sphere parameter values; and comparing said sphericity value and predetermined values to grade said spherical component.

6. A method for grading producing objects from selected object dimensions, comprising the steps of:

determining by calculations a first set of resonant frequencies values as a function of Poisson's ratio for said production objects having ideal object dimensions;

determining by calculations a second set of resonant frequency values as a function of deviation of said selected production dimensions from said ideal object dimensions;

generating a resonant ultrasound spectrum from a one of said production objects, where said spectrum includes a plurality of fine-structure resonance frequency spectra;

estimating from each one of said fine-structure resonance frequency spectra a corresponding degenerate resonance frequency;

determining from said degenerate resonance frequencies resonant frequencies within said first set of resonant frequencies and corresponding values for said selected object dimensions;

determining from said fine-structure resonance frequency spectra deviation values for said corresponding object dimensions; and grading said object from said corresponding object dimensions and said deviation values.

7. A method according to claim 6, wherein the step of determining said corresponding values for said selected object dimensions further comprises the steps of:

determining a value of Poisson's ratio from said degenerate resonance frequencies; and calculating said corresponding object dimensions defective to produce said degenerate resonance frequencies at said determined value of Poisson's ratio.

8. A method according to claim 6, wherein the step of determining said deviation values further comprises the steps of;

calculating from said fine-structure resonance frequency spectra and said ideal object dimensions individual deviation values that produce said fine-structure resonance frequency spectra measured for selected resonances in said spectrum; and averaging said individual deviation values for each one of said selected resonances to determine said deviation value for use in grading said object.

* * * * *